Patented Mar. 14, 1933

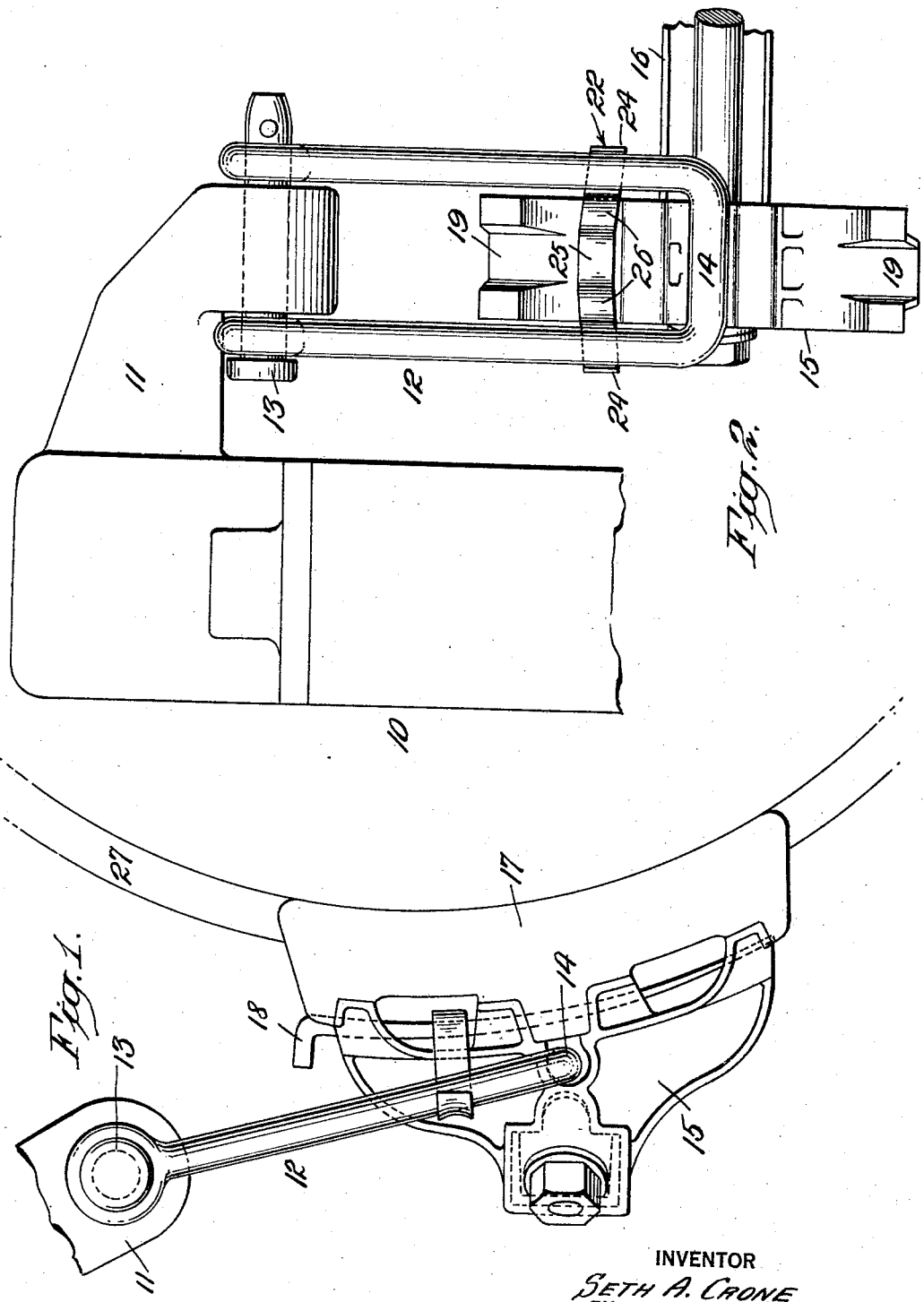

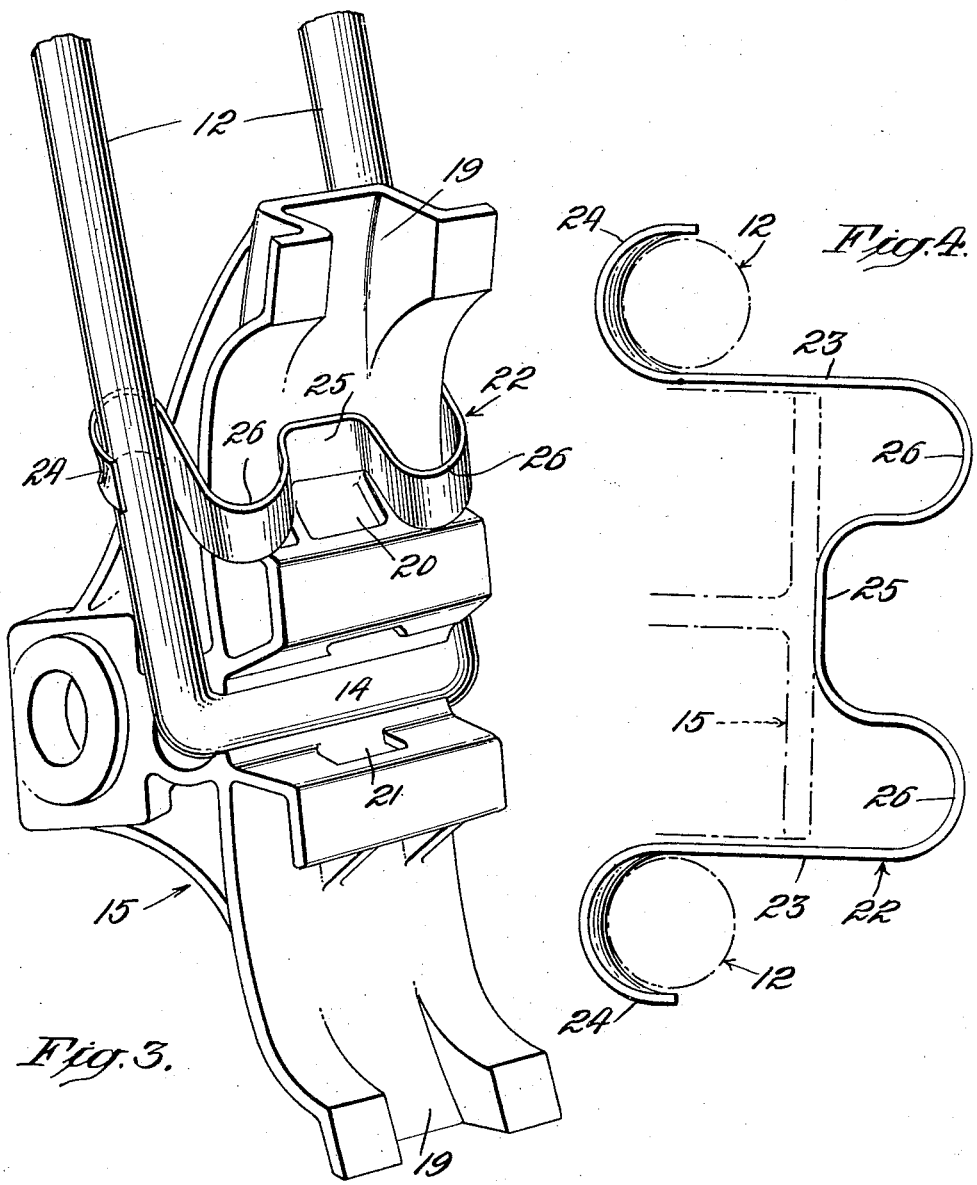

1,901,437

UNITED STATES PATENT OFFICE

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK

BRAKE BEAM ADJUSTER AND RELEASE DEVICE

Application filed June 18, 1930, Serial No. 461,872. Renewed October 7, 1931.

The present invention relates to improvements in means for preventing jamming of the brakes and is of the type wherein the brake shoes are caused to engage the wheels of a railway car by first coming in contact with the wheel treads at the lower ends of the shoes, then to contact with the treads at the upper ends of the shoes in applying the brakes, and wherein a release spring is placed under tension when the shoes are thus applied concentrically to the treads of the wheels, so that when the brakes are released, the upper ends of the shoes are first released from the treads of the wheels during the movement of the shoes away from the wheels.

An object of the present invention is to provide a release spring which bears in opposite directions on the head of a brake shoe and on the hanger which supports the shoe, at points which are arranged adjacent one end of the head and substantially vertical with respect to the pivot or other connection of the head with the hanger, but which bearing points are arranged transversely of the hanger and head, which release spring is of very simple construction and may be quickly applied in position, without the necessity of any fastenings, rivets or the like.

Other objects of the invention are to provide an efficient, practical and durable release spring so constructed that it is easily mounted in position so as to have bearing at the points referred to.

These being among the objects of the present invention, the same consists of certain features of construction and combinations of parts to be hereinafter described and then claimed with reference to the accompanying drawings wherein Figure 1 is a side elevation of the improved device, the brake shoe being shown in action against the tread of a car wheel;

Fig. 2 is an elevation taken from the left of Fig. 1 showing the improved device supported by the hanger from a portion of a car truck frame and also showing a portion of the brake beam, and the brake shoe key and brake shoe being omitted;

Fig. 3 is a perspective view of a hanger and brake shoe head provided with the present improvement, a portion of the hanger being broken away, and Fig. 4 is a plan of the improved release spring illustrating in broken lines how it bears upon the hanger and the brake shoe head.

Referring to the drawings, there is illustrated a portion of a car truck frame 10 which is provided with a bracket 11 for supporting a hanger 12 by means of a suitable pin 13, so that the hanger may be swung in operating the brakes. The hanger 12 is preferably of U-shape so as to provide a loop-form of hanger which is provided with a round cross-bar or cross-piece 14 upon which a brake shoe head 15 is suitably mounted so that it may have a pivotal movement relatively to the hanger. A brake beam 16 connects the brake head 15 at one side of the car with a similar brake head (not shown) at the other side of the car, such brake beam being actuated in one direction or the other by means of a well known brake lever which it is not necessary to illustrate.

The brake shoe 17 is firmly secured to the brake head 15 by means of a locking key 18 in a well known manner, the key 18 being received in end recesses 19 in the brake head and passing through openings 20, 21 at the mid-length of the head.

The present invention resides in a novel construction and arrangement of a release spring 22. Preferably the particular construction of release spring 22, shown in detail in Fig. 4, includes parallel side arms 23 which are provided with oppositely extending hooks 24, and between the arms 23 the release spring is provided with an inwardly deflected portion 25. Inasmuch as the improved release spring is preferably composed of one length of suitable spring steel, the formation of the deflected portion 25 in the strip of steel will result in providing outwardly bowed spring portions 26 which connect the arms 23 with the intermediate deflected portion 25.

As shown clearly in Figs. 1, 2 and 3, the improved release spring is so applied to the hanger 12 and the brake head 15 that the hooks 24 are disposed to bear upon the two side portions of the loop-hanger and the deflected portion 25 to bear upon the inner face of the brake head 15. The preferred construction of the release spring enables the same to be arranged substantially vertical with respect to the pivot connection of the head and hanger, the points at which the spring bears being arranged transversely of the head and hanger. It will be seen that the bearing surfaces of the spring on the hanger and the bearing surface of the spring on the brake shoe head are presented in opposite directions, so that the tendency of the spring is to hold the brake head and brake shoe in the desired position for applying the brake; that is to say before the brake is applied, the angle between the vertical axis of the brake head and the longitudinal axis of the hanger remains the same. However, it will be seen that the spring will be placed under tension when the brake is applied, because the lower end or toe of the brake shoe will first come in contact with the tread of the car wheel 27 shown in Fig. 1, while the final movement of the hanger 12 to fully apply the brake shoe will move the brake shoe concentrically with and upon the tread of the car wheel, thereby placing the active spring portions 26 of the device under tension. When the brake is released, the tension stored up in the spring will act immediately to disengage the upper end or toe of the brake shoe from the tread of the car wheel, thereby preventing jamming, and a further outward movement will entirely disengage the brake shoe from the car wheel.

No fastenings or the like are necessary to secure the improved release spring in position, and during the movement of the hanger, the hooks 24 which connect the release spring with the hanger for the purpose of operating the spring, will have a limited sliding movement on the hanger. As the improved release spring is preferably composed of a single strip of spring steel, it may readily be re-bent under heavy pressure, so as to provide the different required bends, and also these bends preferably lie in one plane, so that when the release spring is installed in using position, it will be disposed substantially horizontally with respect to the hanger and brake shoe head.

It is obvious that the invention is susceptible to modification inasmuch as the invention is not restricted, except as defined in the appended claims.

What I claim as new, is:

1. In combination, a brake head, a hanger with which the head is movably connected, and a release spring bearing in opposite directions on the hanger and head at points which are arranged adjacent one end of the head and substantially vertically with respect to the connection of the head with the hanger, but which bearing points are arranged transversely of the hanger and head.

2. In combination, a brake head, a hanger with which the head is movably connected, and a release spring bearing in opposite directions on the hanger and head at points which are on oppositely disposed sides of the hanger and head.

3. In combination, a brake head, a hanger with which the head is movably connected, and a release spring bearing in opposite directions on the hanger and head at points which are above the connection of the head with the hanger, and on oppositely disposed sides of the hanger and head.

4. In combination, a brake-shoe head, a hanger on which the head is pivoted, and a release spring connected with the hanger at a place above the pivot, and bearing inwardly on the head at a point between the head and the brake-shoe key.

5. In combination, a brake head, a hanger with which the head is movably connected, and a release spring having a bearing relation with the oppositely disposed sides of the hanger and head.

6. In combination, a brake head, a hanger with which the head is movably connected, and a loosely mounted release spring having a bearing relation with the oppositely disposed sides of the hanger and head.

7. In combination, a brake head, a hanger with which the head is movably connected, and a release spring having ends hooked onto the hanger so as to bear on one side thereof and an intermediate portion bearing in opposite direction on the head.

8. In combination, a brake head, a loop-shaped hanger, upon the cross-piece of which the head is pivoted, and a re-bent release spring having side arms with hooks engaged over the hanger, and an intermediate portion deflected inwardly between the arms and bearing on the head, the portions of the spring between the deflected portion and the arms providing the necessary resiliency.

9. In combination, a brake head, a loop-shaped hanger, upon the cross-piece of which the head is pivoted, and a release spring having side arms bearing on the two side portions of the hanger at points above the pivot, the arms extending in a plane transverse of the hanger and brake-head, and the intermediate portion of the spring being deflected inwardly between the arms and bearing on the head in opposite direction to the bearing of the arms on the hanger, the portions of the spring between the arms and the deflected portion being curved outwardly from the arms and deflected portion.

SETH A. CRONE.